G. T. GIFFORD.
Wheel-Cultivator.
No. 57,700.
Patented Sept. 4, 1866.
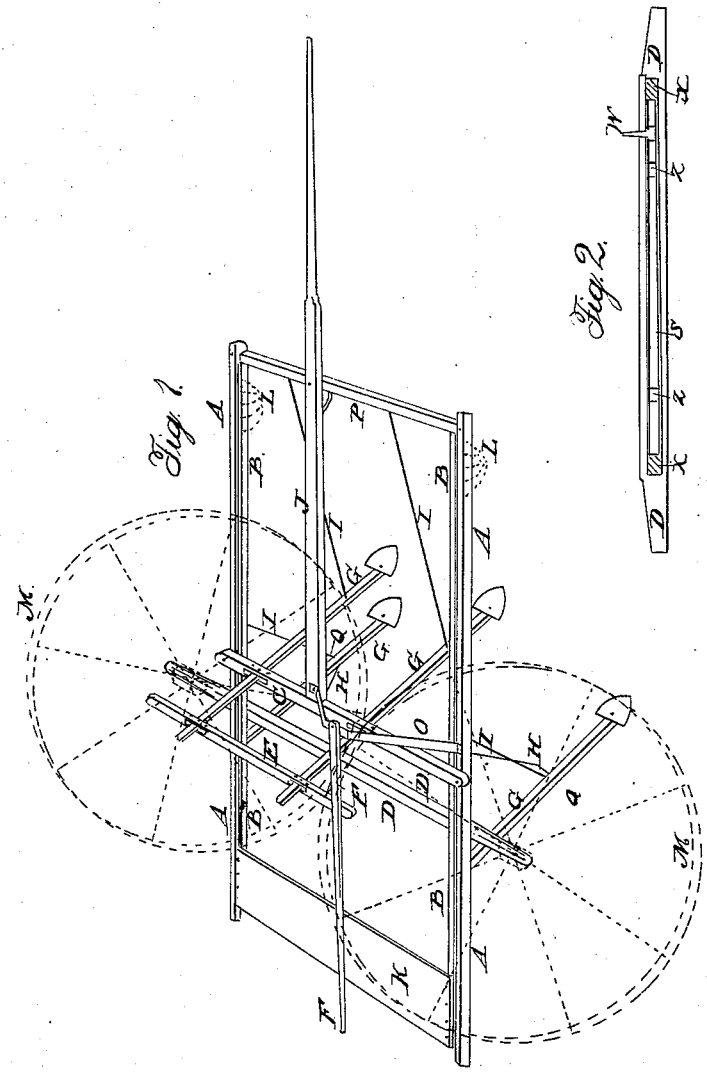

UNITED STATES PATENT OFFICE.

GEORGE T. GIFFORD, OF MONMOUTH, ILLINOIS.

IMPROVEMENT IN CULTIVATORS.

Specification forming part of Letters Patent No. 57,700, dated September 4, 1866.

*To all whom it may concern:*

Be it known that I, GEORGE T. GIFFORD, of the city of Monmouth, county of Warren and State of Illinois, have invented a new and Improved Riding or Walking Cultivator, for cultivating corn, potatoes, beans, &c.; and I do hereby declare that the following is a full, clear, and exact description of the same, reference being had to the annexed drawings, making part of this specification, in which—

Figure 1 is a perspective view. Fig. 2 is a sectional plan of the rear of the axle. (Seen at letter D in Fig. 1.)

In order to enable others skilled in the art to make and use my invention, I will describe its construction and operation.

Letters B B represent a frame, bolted solid on the axle D, and supporting the seat-board K. The ends of the frame, forward B B, are pivoted by a bolt at L L to another frame fitting close outside of it. This outside frame, A A, supports the plows G G G G, the two rear and outside shanks of the plows being mortised into the frame, and the two forward ones pass through slots in the cross-bar C. Another cross-bar, E, is fastened to their tops by being slotted onto them. To this bar E is attached the hand-lever F, the end of which is supported by the brace O. The tongue is also mortised into the cross-bar C, and bolted onto the cross frame-piece P.

The axle behind is grooved, (see Fig. 2,) to admit the sliding rod S, which is provided with two ribs, X X. When the plows are lifted from the ground, and this rod S slid to the right, these ribs will enter the notches Q Q in rear plow-shanks, Fig. 1, and hold the plows up from the ground while being removed.

It will readily be seen that by lifting on the lever F, or the hind end of the frame A A, the whole of the plows can be controlled in vertical movements, regulating the depth at will, the pressure being assisted, when necessary, by the feet on the rods H H. The leverage in this principle admits of controlling the plows in hard ground in a superior manner.

Side motion of the two inside plows next the finishing-row is obtained by the lever F.

The two forward plows can be regulated any desirable width apart by the pins in the bars C and E. Different holes are provided at L L, where the inside and outside frames are pivoted together to admit of sliding the outside frame forward, and lengthening it forward of the axle, in order to balance the whole thing with a light or heavy driver, or when the plows are all up or in the ground.

Examination will show that if the wheels, axle, and inside frame are removed, an effective cultivator is left, easily managed as a walking-plow. The addition of the other frame, while it enables the lame, &c., to ride and plow, is in such a manner that the weight of the driver actually tends to lift the plows, which are attached, too, in such a manner as to support them, and not leave them as uncontrollable drags, running everywhere, as is the case with most cultivators.

What I claim as my invention, and desire to secure by Letters Patent, is—

1. The arrangement of the frames B and A and movable pivot L L, for balancing, substantially as described.

2. The combination of the lever F, cross-bars E and C, and plows G G, with the inside frame, for the purposes set forth, and substantially as described.

3. The arrangement of frames B B and A A, by which the weight of driver supports or tends to lift plows, substantially as described.

4. The slide S, operating in the axle, as described, and for the purpose set forth.

GEORGE T. GIFFORD.

Witnesses:
 W. B. RICHARDS,
 J. A. YOUNG.